(12) United States Patent
Hwang

(10) Patent No.: US 11,920,954 B2
(45) Date of Patent: Mar. 5, 2024

(54) SENSOR

(71) Applicant: AUTONICS CORPORATION, Busan (KR)

(72) Inventor: Doick Hwang, Incheon (KR)

(73) Assignee: AUTONICS CORPORATION, Busan (KR)

( * ) Notice: Subject to any disclaimer, the term of this patent is extended or adjusted under 35 U.S.C. 154(b) by 161 days.

(21) Appl. No.: 17/439,259

(22) PCT Filed: Mar. 3, 2020

(86) PCT No.: PCT/KR2020/003005
§ 371 (c)(1),
(2) Date: Sep. 14, 2021

(87) PCT Pub. No.: WO2020/197114
PCT Pub. Date: Oct. 1, 2020

(65) Prior Publication Data
US 2022/0155110 A1    May 19, 2022

(30) Foreign Application Priority Data

Mar. 28, 2019    (KR) .................. 10-2019-0035932

(51) Int. Cl.
*G01D 11/26*    (2006.01)
*G01D 11/24*    (2006.01)
*G01V 8/20*    (2006.01)

(52) U.S. Cl.
CPC .......... *G01D 11/245* (2013.01); *G01D 11/26* (2013.01); *G01V 8/20* (2013.01)

(58) Field of Classification Search
CPC .......... G01D 11/245; G01D 11/26; G01V 8/20
See application file for complete search history.

(56) References Cited

U.S. PATENT DOCUMENTS

| | | | |
|---|---|---|---|
| 8,841,690 B1* | 9/2014 | Kim | ................... H01L 33/54 |
| | | | 257/E33.059 |
| 2012/0112049 A1 | 5/2012 | Shimokawa et al. | |

FOREIGN PATENT DOCUMENTS

| | | |
|---|---|---|
| EP | 3 270 187 A1 | 1/2018 |
| EP | 3 270 189 A1 | 1/2018 |
| EP | 3 270 190 A1 | 1/2018 |
| JP | 2010-165550 A | 7/2010 |
| KR | 10-0822037 B1 | 4/2008 |

(Continued)

*Primary Examiner* — Jamel E Williams
(74) *Attorney, Agent, or Firm* — Birch, Stewart, Kolasch & Birch, LLP

(57) ABSTRACT

A sensor is disclosed. The sensor includes: an elongated and hollow housing having a first opening formed in a longitudinal direction of the housing, and a second opening formed at one end thereof; a cap closing the second opening; an elongated cover covering the first opening and having one end coupled to the cap; a first receiving groove formed on the housing at a position adjacent to the first opening and facing the cover; a second receiving groove formed on the cap at a position facing the cover; a front sealing member inserted into the first receiving groove and the second receiving groove, and coming into contact with the cover; a groove formed on the cap at a position adjacent to the second opening and facing one end of the housing; and a side sealing member inserted into the groove and coming into contact with the one end of the housing.

17 Claims, 14 Drawing Sheets

(56) References Cited

FOREIGN PATENT DOCUMENTS

| KR | 20-2011-0003836 U | 4/2011 |
| KR | 10-1126586 B1 | 3/2012 |
| KR | 10-2018-0112624 A | 10/2018 |

\* cited by examiner

SENSOR

CROSS REFERENCE TO RELATED APPLICATIONS

This application is the National Phase of PCT International Application No. PCT/KR2020/003005, filed on Mar. 3, 2020, which claims priority under 35 U.S.C. 119(a) to Patent Application No. 10-2019-0035932, filed in the Republic of Korea on Mar. 28, 2019, all of these applications being hereby expressly incorporated by reference into the present application.

TECHNICAL FIELD

The present disclosure relates to a sensor, and more particularly to an area sensor capable of sensing a predetermined area.

BACKGROUND ART

An area sensor is a sensor for sensing a specific area by using a plurality of light sources. The area sensor may be used in various applications, such as entrance, elevator, moving walk, escalator, and the like. That is, the area sensor may sense the presence of an individual or an object in a specific area and may be widely used in places requiring such function.

The sensor or the area sensor may be installed in various places. That is, the sensor or the area sensor may be installed indoors or outdoors. In the case where the sensor or the area sensor is installed outdoors (or installed even indoors), durability of the sensor may decrease or performance of the sensor may be degraded due to outside air with high humidity or water.

Recently, many studies are conducted to improve deterioration in performance or durability of the sensor due to external environments.

DISCLOSURE OF INVENTION

Technical Problem

It is an object of the present invention to solve the above and other problems. It is another object of the present invention to provide a sensor capable of preventing deterioration in performance or durability of the sensor due to moisture.

It is yet another object of the present invention to improve a waterproof structure of a sensor.

It is still another object of the present invention to improve structural characteristics of a sensor while reducing production costs.

Technical Solution

In accordance with an aspect of the present invention, the above and other objects can be accomplished by providing a sensor, including: an elongated and hollow housing having a first opening formed in a longitudinal direction of the housing, and a second opening formed at one end thereof; a cap closing the second opening; an elongated cover covering the first opening and having one end coupled to the cap; a first receiving groove formed on the housing at a position adjacent to the first opening and facing the cover; a second receiving groove formed on the cap at a position facing the cover; a front sealing member inserted into the first receiving groove and the second receiving groove, and coming into contact with the cover; a groove formed on the cap at a position adjacent to the second opening and facing one end of the housing; and a side sealing member inserted into the groove and coming into contact with the one end of the housing.

According to another embodiment of the present invention, in a direction from the cap toward the housing, an area of the front sealing member, disposed on the second receiving groove, may decrease toward the housing.

According to yet another embodiment of the present invention, the front sealing member, disposed on the first receiving groove, may come into contact with at least two surfaces of the cover based on an edge of the cover facing the first receiving groove.

According to still another embodiment of the present invention, the cap may further include: an insertion groove connecting the second receiving groove and the groove; and a connection part disposed in the insertion groove and connecting the front sealing member and the side sealing member.

According to still another embodiment of the present invention, the cap may have a bottom facing the second opening of the housing, a side wall formed around the bottom, and a cable hole formed by passing through the bottom; and the side sealing member may have parts disposed in the groove, and a bridge connecting the parts across the bottom, wherein the bridge may be coupled to the bottom.

According to still another embodiment of the present invention, the sensor may further include: a cable inserted into the cable hole; a waterproof ring inserted into the cable hole and coming into contact with the cable hole; and a rubber coming into contact with an outer circumferential surface of the cable and inserted into the waterproof ring to be in tight contact with the waterproof ring.

According to still another embodiment of the present invention, the waterproof ring and the rubber may have inclined surfaces corresponding to each other.

According to still another embodiment of the present invention, the cap may have a slot disposed adjacent to one end of the cover, wherein the one end of the cover may be inserted into the slot.

According to still another embodiment of the present invention, the cover may be attached to the front sealing member.

According to still another embodiment of the present invention, the sensor may further include a light emitting part or a light receiving part installed in the housing, wherein the cover may be formed as a light transmitting plate.

Advantageous Effects

The sensor according to the embodiments of the present invention has the following effects.

According to at least one of the embodiments of the present invention, deterioration in performance or durability of the sensor due to moisture may be prevented.

In addition, according to at least one of the embodiments of the present invention, a waterproof structure of the sensor may be improved.

Further, according to at least one of the embodiments of the present invention, production costs of the sensor may be reduced while improving structural characteristics of the sensor.

BEST MODE FOR CARRYING OUT THE INVENTION

Figure 1:
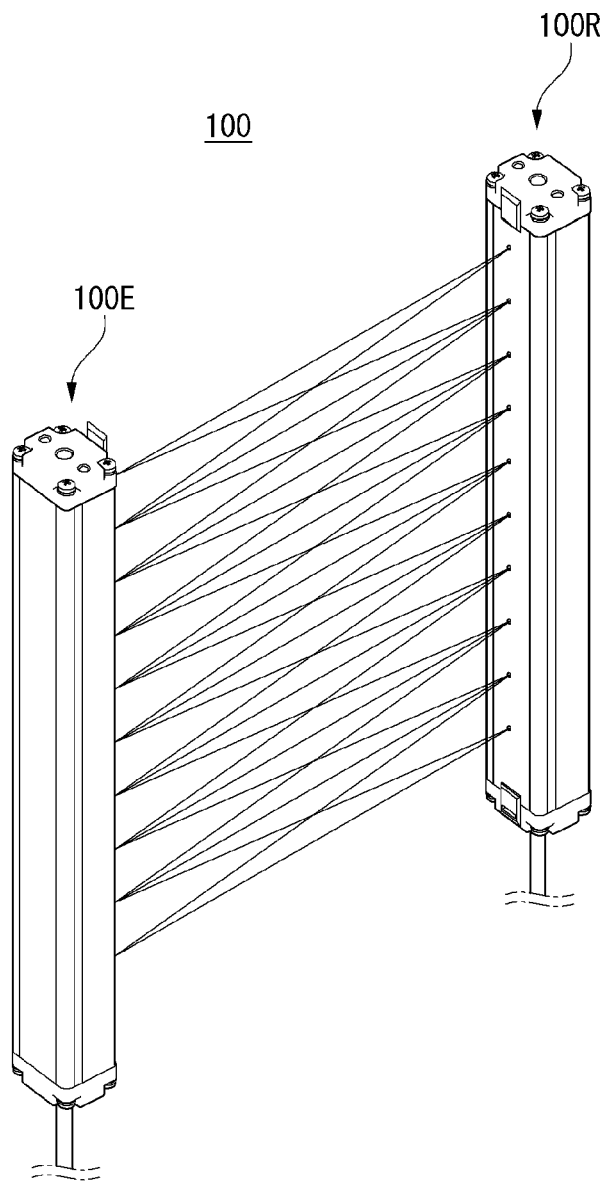
FIGS. 1 to 14 are diagrams illustrating examples of a sensor according to embodiments of the present invention.

Hereinafter, the present disclosure will be described in detail with reference to the accompanying drawings, in which the same reference numerals are used throughout the drawings to designate the same or similar components, and a redundant description thereof will be omitted.

Terms "module" and "unit" for elements used in the following description are given simply in view of the ease of the description, and do not have a distinguishing meaning or role.

It will be noted that a detailed description of known arts will be omitted if it is determined that the detailed description of the known arts can obscure the embodiments of the invention.

Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

It should be understood that the terms "comprise", 'include", "have", etc. when used in this specification, specify the presence of stated features, integers, steps, operations, elements, components, or combinations thereof but do not preclude the presence or addition of one or more other features, integers, steps, operations, elements, components, or combinations thereof.

A sensor 100 may be referred to as an area sensor 100, considering that the sensor 100 senses a predetermined area.

Referring to FIG. 1, the area sensor 100 may include an emitter 100E and a receiver 100R. The emitter 100E may face the receiver 100R. The emitter 100E may emit light. The emitter 100E may include a light emitting element. The emitter 100E may be referred to as a light emitting unit 100E or a light transmitter 100E. The emitter 100E may include a plurality of light emitting elements. The plurality of light emitting elements may be arranged in sequence or in series on one surface of the emitter 100E.

The receiver 100R may sense light. The receiver 100R may include a light receiving element. The receiver 100R may be referred to as a light receiving unit 100R or a light receiving device 100R. The receiver 100R may include a plurality of light receiving elements. The plurality of light receiving elements may be arranged in sequence or in series on one surface of the receiver 100R.

The light provided by the emitter 100E may be sensed by the receiver 100R. If an individual or an object is present between the emitter 100E and the receiver 100R, the light provided by the emitter 100E is partially blocked, such that the presence of an individual or an object in a sensed area may be sensed.

Figure 2:
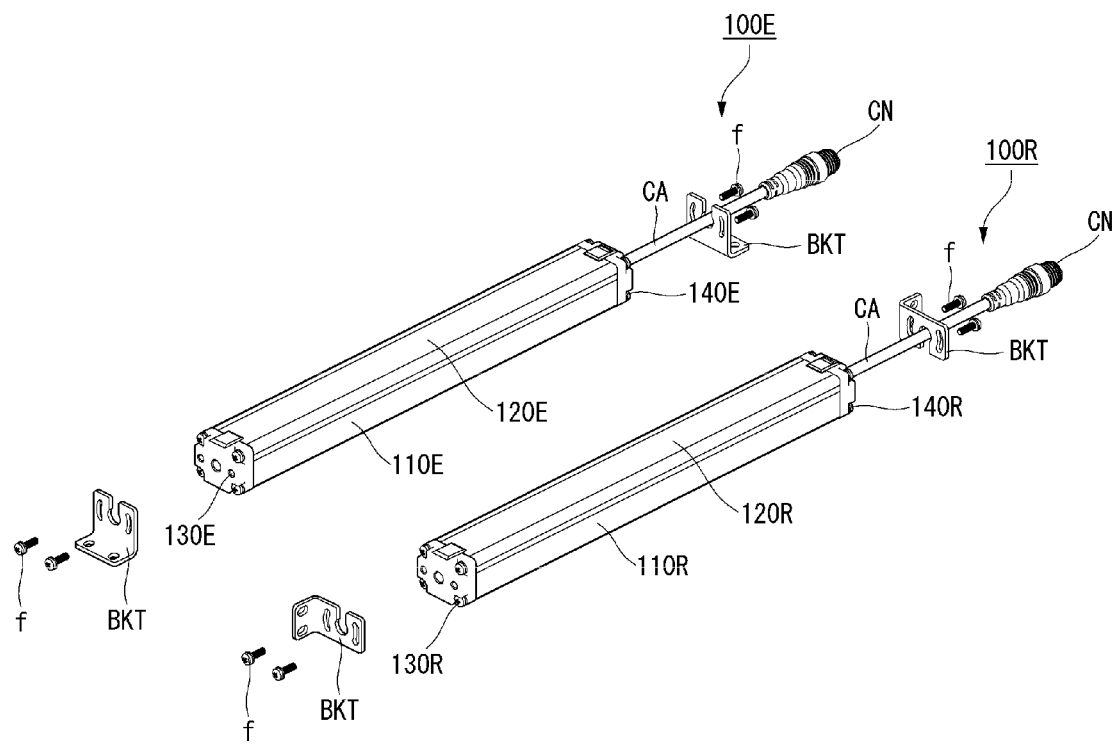

Referring to FIG. 2, the emitter 100E may include a housing 100E, a light emitting part 120E, and caps 130E and 140E. The housing 110E may be elongated and may have a receiving space formed therein. The light emitting part 120E may be formed on one surface of the housing 110E. The light emitting part 120E may be elongated on one surface or one side of the housing 100E along a longitudinal direction of the housing 110E. The caps 130E and 140E may be mounted on one end and/or an opposite end of the housing 110E. For example, the light emitting part 120E and the housing 110E may be coupled to each other by the caps 130E and 140E.

The emitter 100E may include a cable CA. The cable CA may be electrically connected to the light emitting part 120E. The cable CA may be connected to an external source on one side of the housing 110E or the cap 140E. The cable CA has one side electrically connected to the light emitting part 120E and an opposite side connected to a connector CN. Accordingly, the emitter 100E may receive power or a control signal from an external source.

The emitter 100E may include a bracket BKT. The bracket BKT may be mounted or coupled to one end or both ends of the emitter 100E. The bracket BKT may be used for installing or mounting the emitter 100E in predetermined equipment. The bracket BKT may be mounted on the emitter 100E by a coupling member f.

The receiver 100R may include a housing 110R, a light receiving part 120R, and caps 130R and 140R. The receiver 100R may include a cable CA and a bracket BKT. In describing the housing 110R, the caps 130R and 140R, the cable CA, and/or the bracket BKT, the description of that or those of the emitter 100E may be equally applied thereto. In FIG. 2, the description of the light emitting part 120E may be equally applied to the description of the light receiving part 120R.

In the following description, the emitter 100E and the receiver 100R will be collectively referred to as the sensor 100, without being distinguished from each other.

Figure 3:
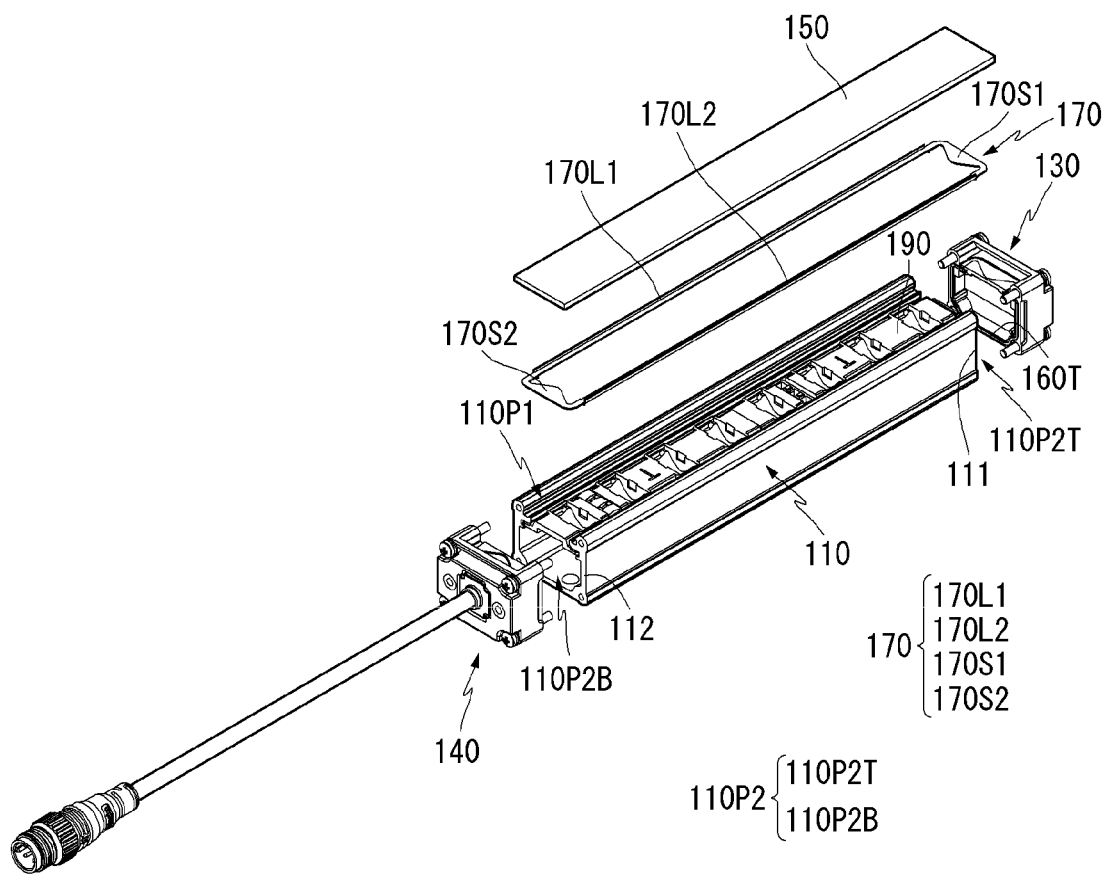

Referring to FIG. 3, the housing 110 may be elongated and hollow to provide a receiving space. For example, the housing 110 may have a long cylindrical shape or a square column shape. The housing 110 may have an opening 110P1 which is elongated on one surface thereof in a longitudinal direction. The opening 110P1 may be referred to as a first opening 110P1. The housing 110 may have an opening 110P2 or openings 110P2 on one end or both ends. The opening 110P2 or openings 110P2 may be referred to as a second opening 110P2 or second openings 110P2. The openings 110P2 may include an upper opening 110P2T and a lower opening 110P2B. The first opening 110P1 may communicate with the second opening 110P2.

The light emitting element and/or the light receiving element may be mounted in the receiving space of the housing 110. A sensing module 190 may include the light emitting element and/or the light receiving element.

The cap 130 may close the upper opening 110P2T formed on an upper end of the housing 110. Further, the cap 140 may close the lower opening 110P2B formed on a lower end of the housing 110. The structure of both ends of the housing 110 may be the same.

A sealing member 160T may be disposed between the cap 130 and one end of the housing 110. The sealing member 160T may be disposed around the upper opening 110P2T of the housing 110. The sealing member 160T may be referred to as a first sealing member 160T. The first sealing member 160T may be referred to as an upper sealing member 160T.

The cover 150 may have a shape of an elongated flat plate and may cover the first opening 110P1 of the housing 110. The cover 150 may be referred to as a front cover 150 or a light transmitting cover 150.

A sealing member 170 may be disposed between the housing 110 and the cover 150. The sealing member 170 may referred to as a second sealing member 170. The second sealing member may be referred to as a front sealing member 170.

Figure 4:
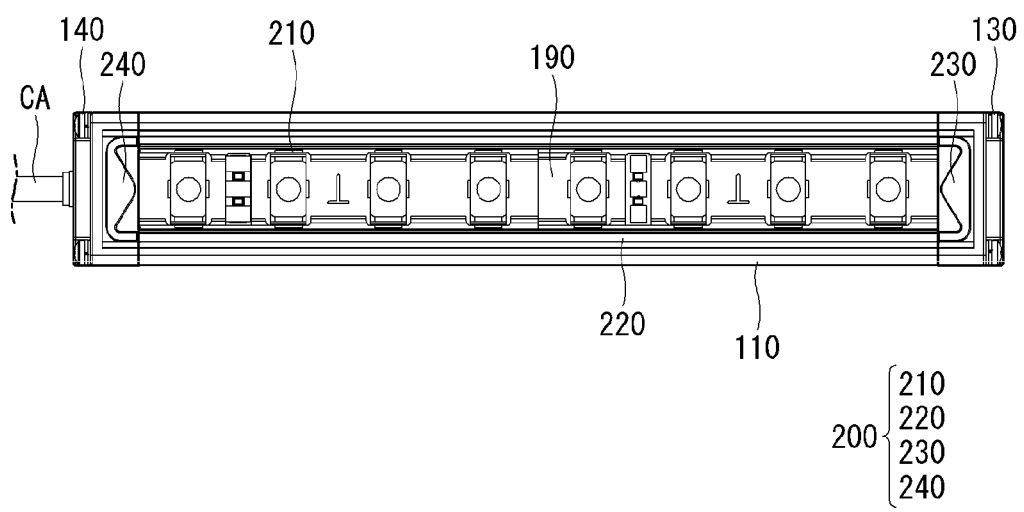
Figure 5:
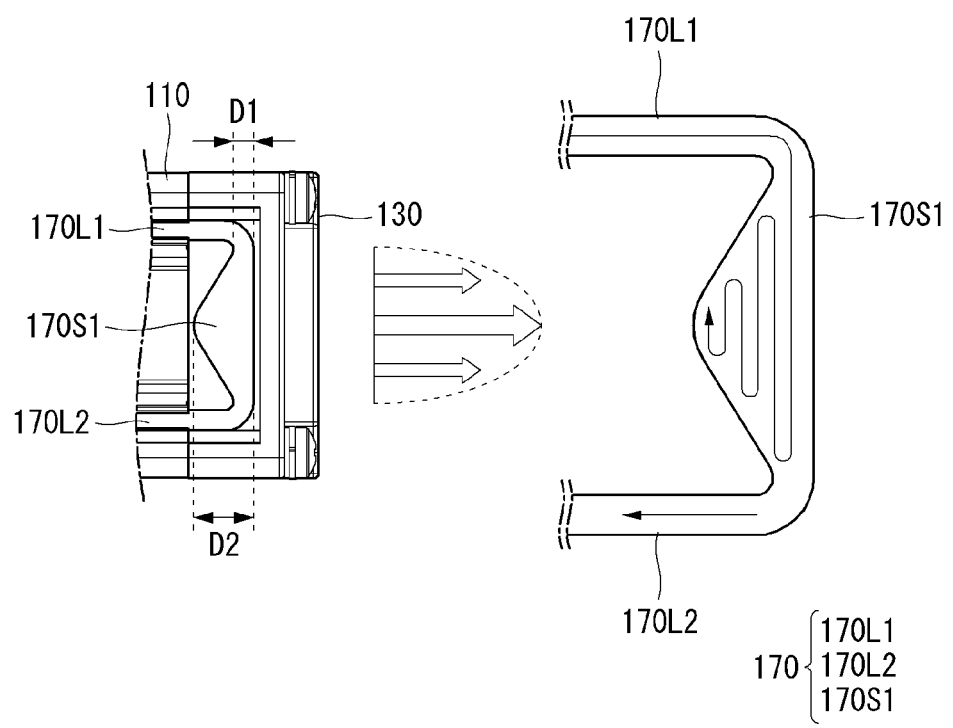

Referring to FIGS. 3 to 5, the front sealing member 170 may be coated on grooves 210 and 220, formed on a front surface of the housing 110, and grooves 230 and 240 formed on a front surface of the caps 130 and 140. The grooves 210, 220, 230, and 240 may be collectively referred to as receiving grooves 200. The grooves 210 and 220 may be referred to as first receiving grooves 210 and 220, and the grooves 230 and 240 may be referred to as second receiving grooves 230 and 240.

The front sealing member 170 may have elasticity and/or adhesive strength. The coated front sealing member 170 may be cured after the lapse of a predetermined period of time. By coating the front sealing member 170, a process time may be reduced.

The front sealing member 170 may include a first longitudinal portion 170L1, a second longitudinal portion 170L2, a first side portion 170S1, and a second side portion 170S2. The first longitudinal portion 170L1 and/or the second longitudinal portion 170L2 may be formed on the grooves 210 and 220 of the housing 110, and the first side portion 170S1 and/or the second side portion 170S2 may be formed on the grooves 230 and 240 of the caps 130 and 140.

The first side portion 170S1 and/or the second side portion 170S2 may have an overall triangular shape. A center width D2 may be greater than a side width D1. Accordingly, it is possible to prevent components from being separated due to contraction and/or expanding of the front sealing member 170.

By increasing a contact area between the front sealing member 170 and the cover 150, waterproofness of the sensor may be improved.

Figure 6:
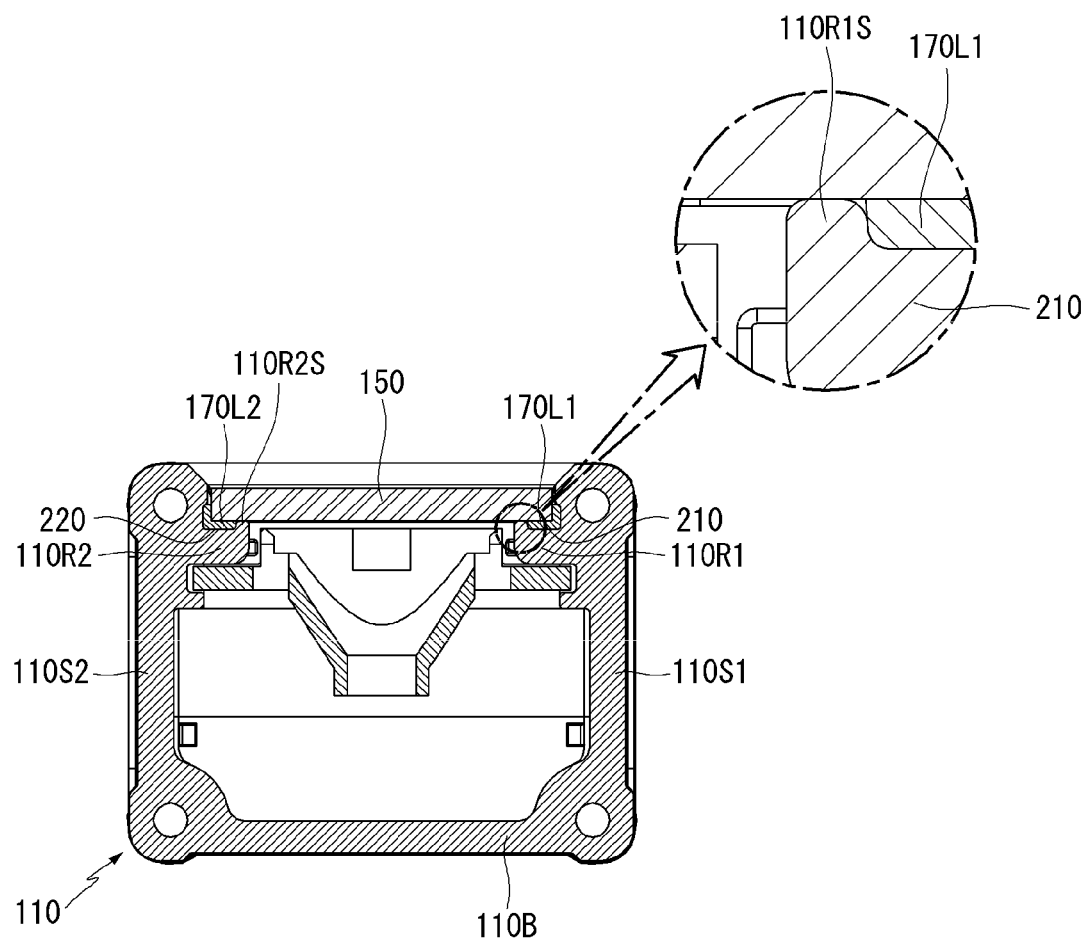

Referring to FIG. 6, the housing 110 may include a bottom 110B and side walls 110S1 and 110S2. The bottom 110B may be an elongated plate. The side walls 110S1 and 110S2 may be disposed opposite each other and may be formed on both sides of the bottom 110B.

The side walls 110S1 and 110S2 may have loops 110R1 and 110R2 formed on an upper side thereof. The loops 110R1 and 110R2 may protrude inwardly of the housing 110 from the side walls 110S1 and 110S2.

The grooves 210 and 220 may be formed in the loops 110R1 and 110R2 or may be formed in the loops 110R1 and 110R2 and the side walls 110S1 and 110S2. The groove 210 may be formed in the loop 110R1 and/or the side wall 110S1, and the groove 220 may be formed in the loop 110R2 and/or the side wall 110S2. The grooves 210 and 220 may have an overall L-shape. As a contact area between the front sealing members 170L1 and 170L2 and the cover 150 increases, the cover 150 may be firmly fixed, and waterproofness may be improved.

Dams 110R1S and 110R2S may protrude from the loops 110R1 and 110R2, so as to prevent overflow of the sealing member 170 to be coated. The dams 110R1S and 110R2S may be referred to as stepped portions 110R1S and 110R2S.

Figure 7:
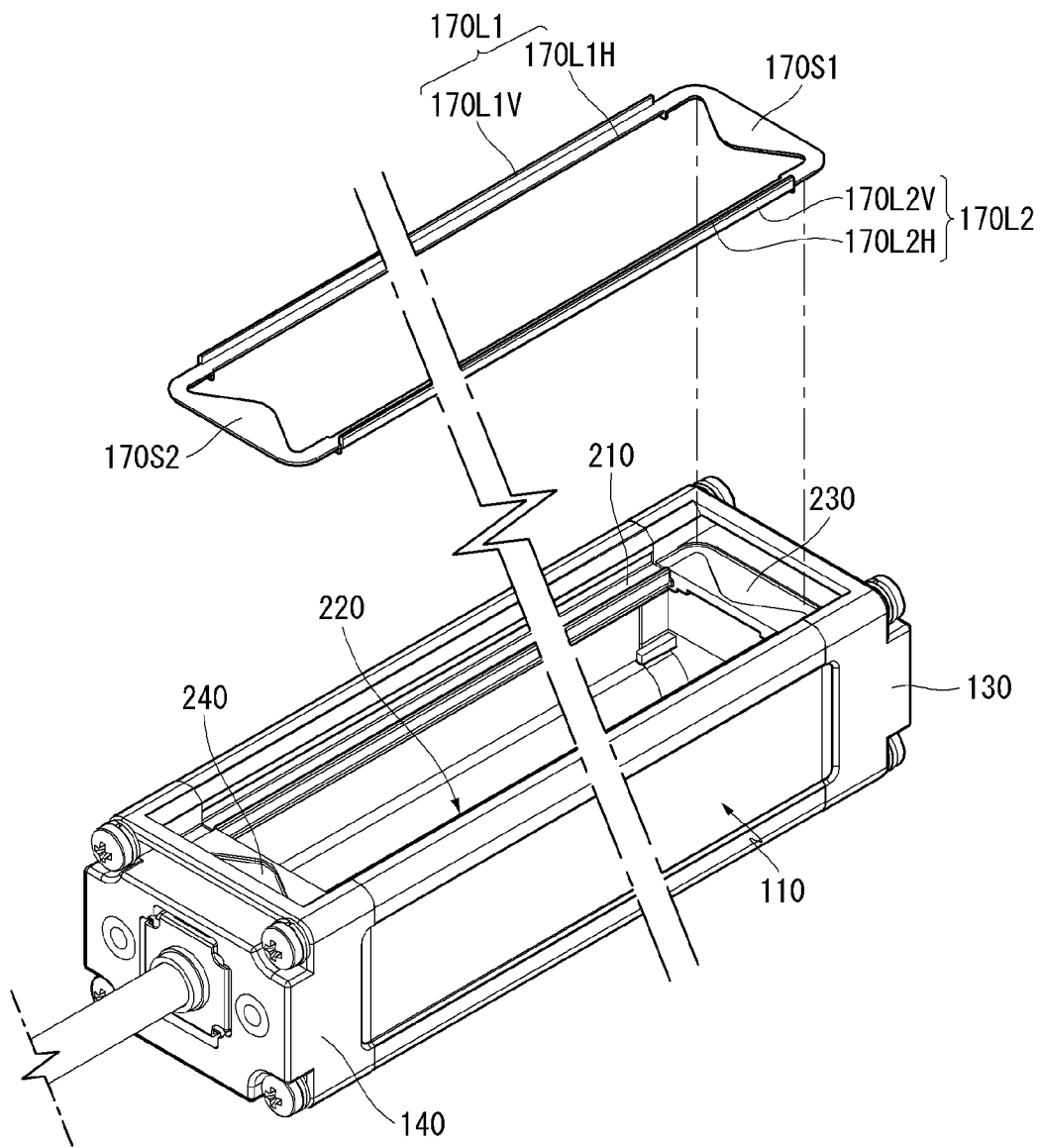
Figure 8:
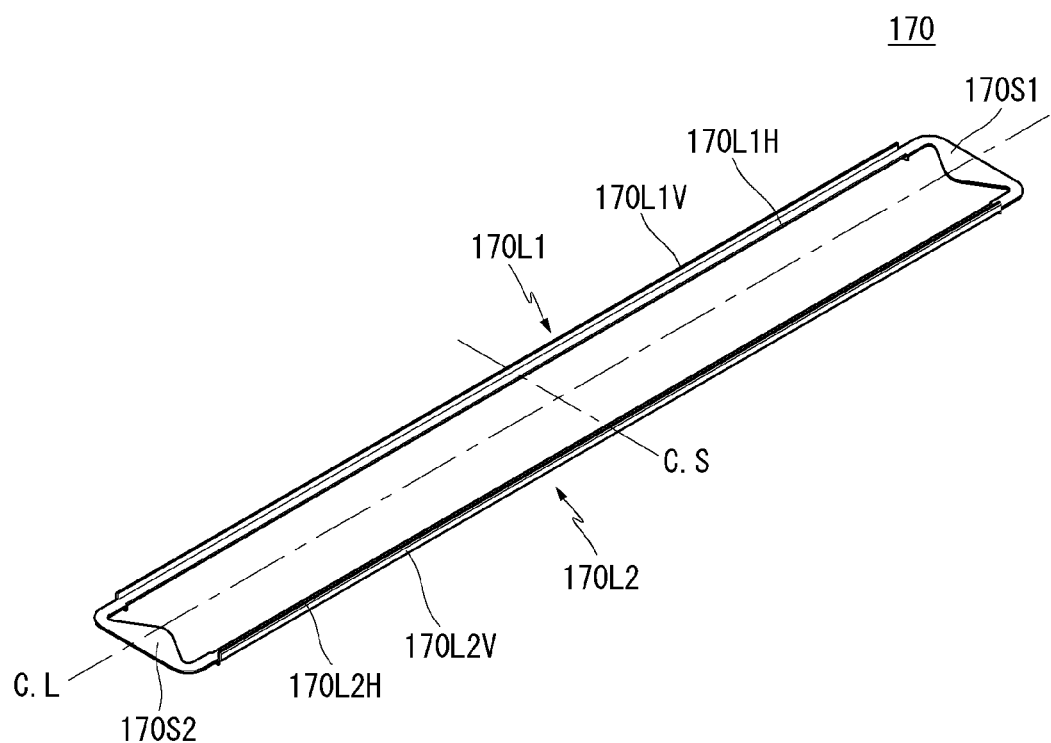

Referring to FIGS. 7 and 8, the first longitudinal portion 170L1 may form most of a length of the second sealing member 170. The first longitudinal portion 170L1 may correspond to a length of the housing 110 (see FIG. 3). The first longitudinal portion 170L1 may have a first horizontal portion 170L1H and a first vertical portion 170L1V. The second longitudinal portion 170L2 may be parallel to the first longitudinal portion 170L1. The second longitudinal portion 170L2 may have a second horizontal portion 170L2H and a second vertical portion 170L2V. The first side portion 170S1 may connect one end of the first longitudinal portion 170L1 and one end of the second longitudinal portion 170L2. The second side portion 170S2 may connect an opposite end of the first longitudinal portion 170L1 and an opposite end of the second longitudinal portion 170L2.

The first longitudinal portion 170L1 may be located in or attached to the groove 210 of the housing 110; the second longitudinal portion 170L2 may be located in or attached to the groove 220 of the housing 110; the first side portion 170S1 may be located in or attached to the groove 230 of the cap 130; the second side portion 170S2 may be located in or attached to the groove 240 of the cap 140. The second sealing member 170 may be symmetrical with respect to a center line CL in a length direction. The second sealing member 170 may be symmetrical with respect to a center line CS in a width direction.

Figure 9:
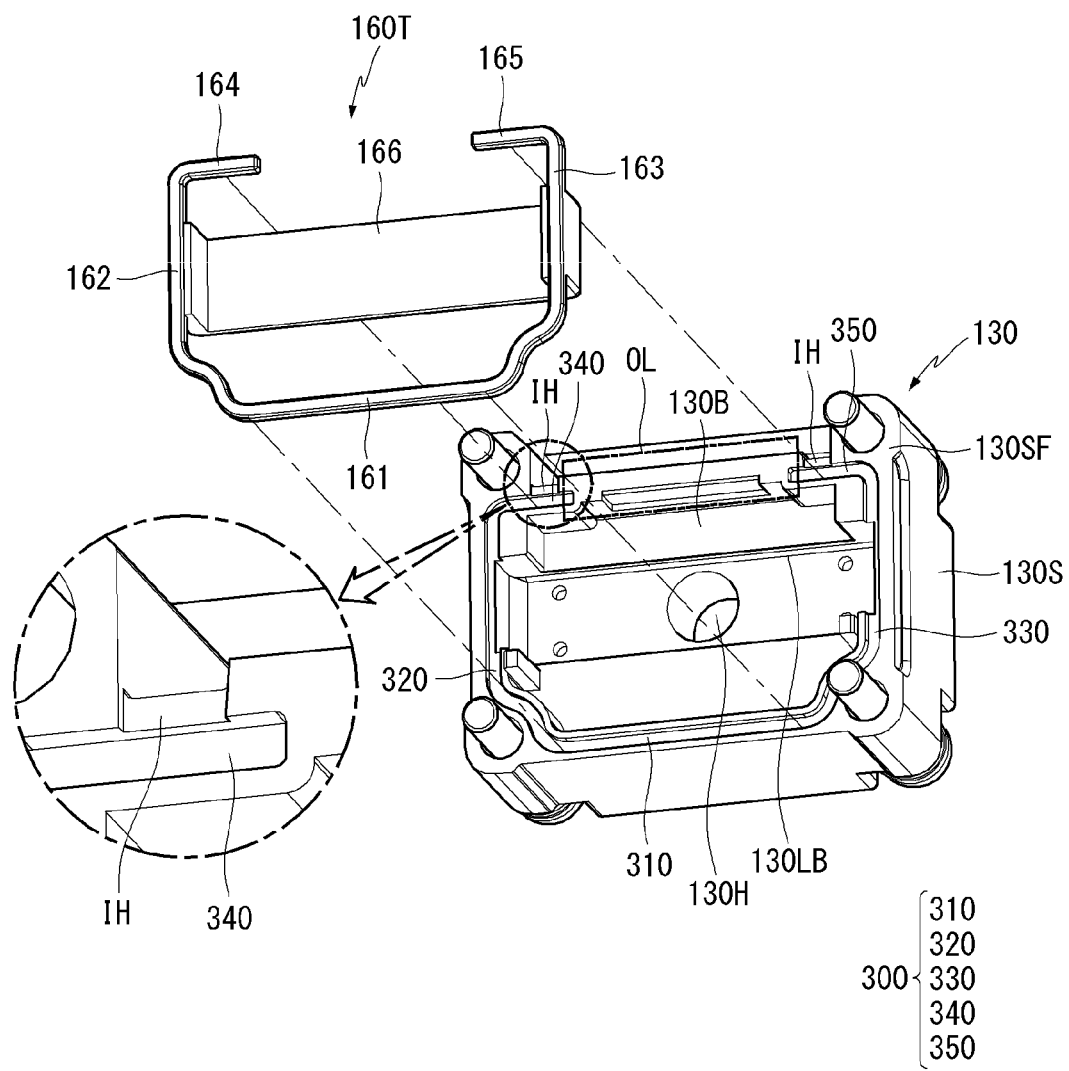

Referring to FIG. 9, the cap 130 may have an overall tub shape. The cap 130 may include a bottom 130B and a side wall 130S. A through-hole 130H may be formed in the bottom 130B. The side wall 130S may have an upper end surface 130SF which faces and comes into contact with one end surface 111 (see FIG. 3) of the housing (see FIG. 3). The groove 300 may be formed on the upper end surface 130SF of the side wall 130S. The groove 300 may have an overall C-shape. In this case, an open portion OL of the loop of the groove 300 may be positioned adjacent to the cover 150 (see FIG. 3) of the sensor.

The first sealing member 160T may have an overall C-shape corresponding to the groove 300. The first sealing member 160T may be referred to as the side sealing member 160T. The first sealing member 160T may include a first part 161, a second part 162, a third part 163, a fourth part 164, a fifth part 165, and a bridge 166. The second part 162 may be extended by being bent from the first part 161. The third part 163 may be disposed opposite the second part 162, and may be extended by being bent from the first part 161. The fourth part 164 may be extended by being bent from the second part 162, and may be disposed opposite the first part 161. The fifth part 165 may be extended by being bent from the third part 163, and may be disposed opposite the first part 161. The bridge 166 may connect the second part 162 and the third part 163. The bridge 166 may come into contact with the bottom 130B of the cap 130. A bridge receiving portion 130LB may be recessed from the bottom 130B, and the bridge 166 may be placed in the bridge receiving portion 130LB. The bridge 166 may not only improve convenience in assembly, but also seals the through-hole 130H and the like formed on the cap 130, thereby improving waterproofness of the sensor.

Figure 10:
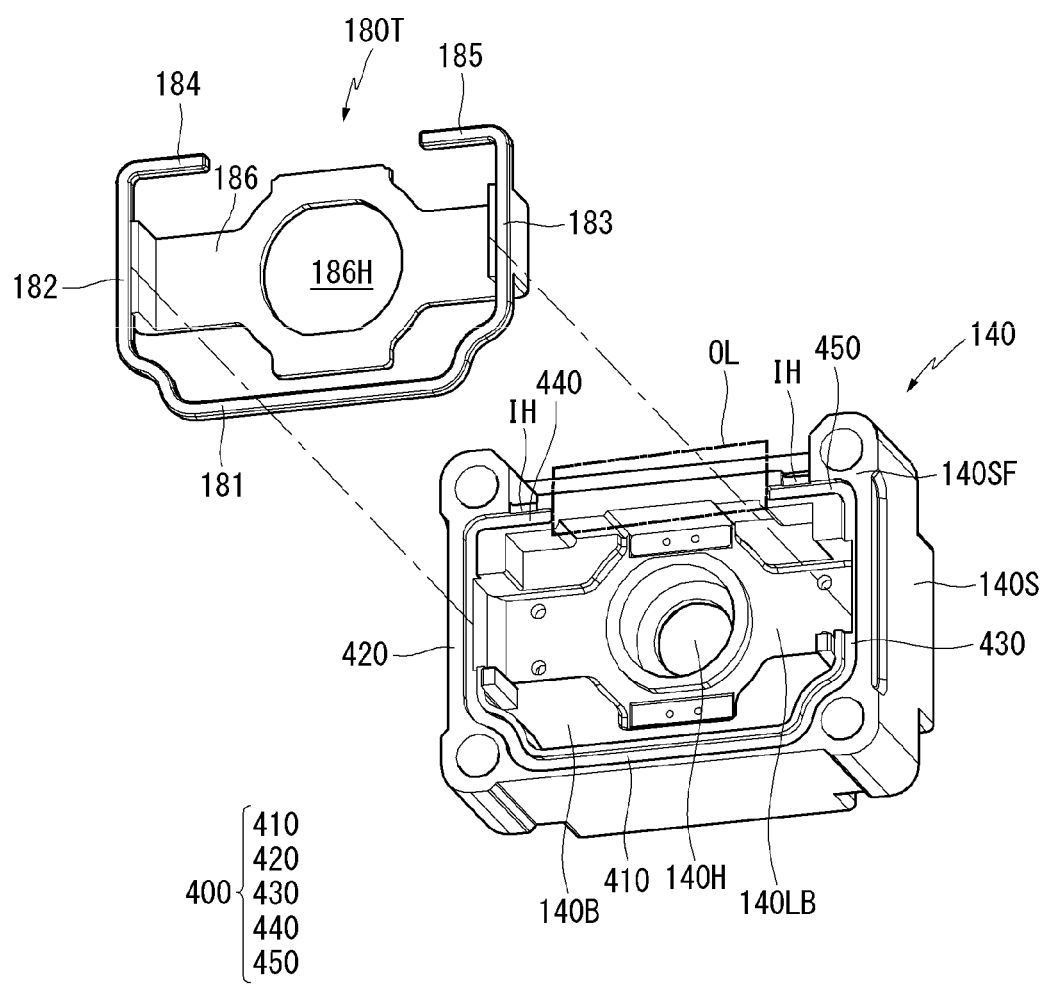
Figure 11:
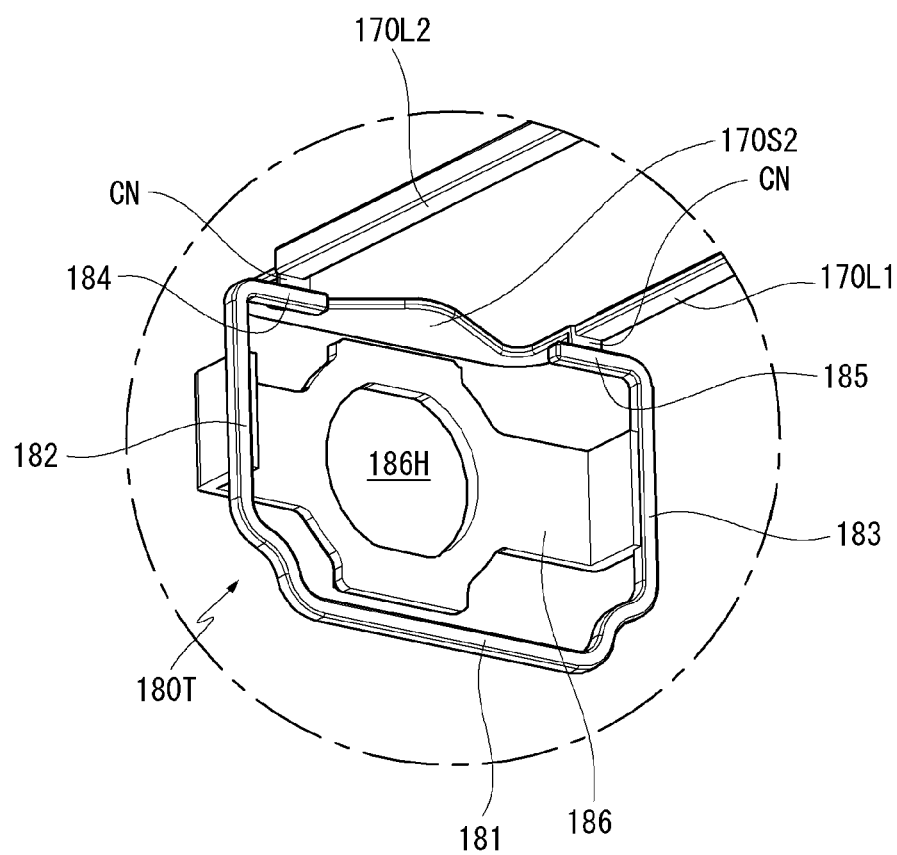
Figure 12:
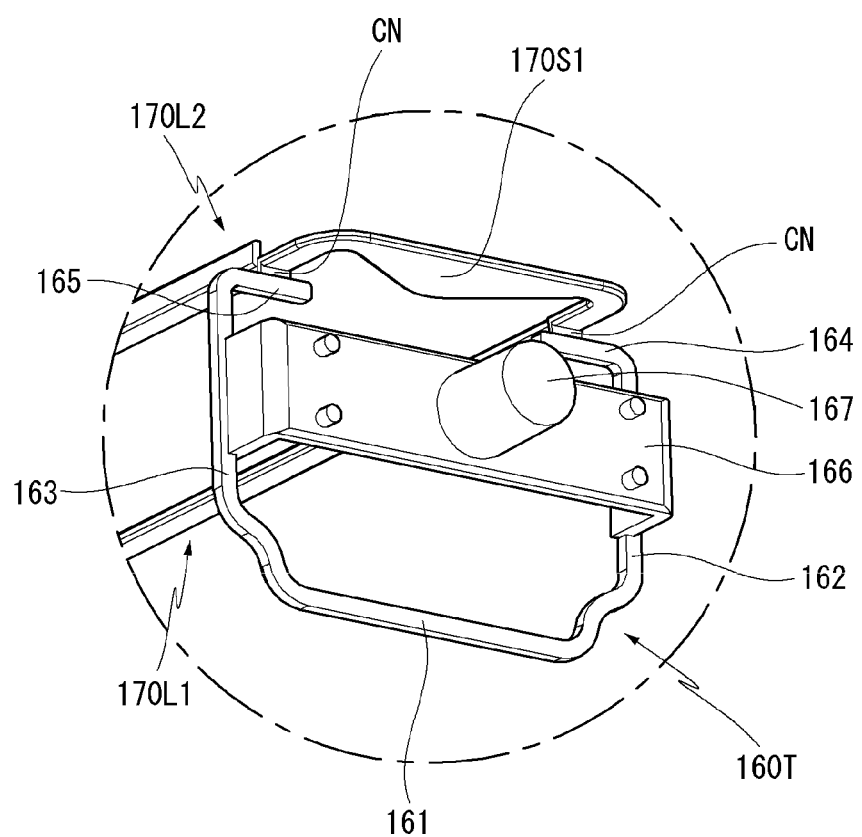

Referring to FIG. 10, the cap 140 may have an overall tub shape. The cap 140 may include a bottom 140E and a side wall 140S. A through-hole 140H may be formed in the bottom 140H. The side wall 140S may have an upper end surface 140SF which faces and comes into contact with one end surface 112 (see FIG. 3) of the housing 110 (see FIG. 3). A groove 400 may be formed on the upper end surface 140SF of the side wall 140S. The groove 400 may have an overall C shape. In this case, an open portion OL of the loop of the groove 400 may be positioned adjacent to the cover 150 (see FIG. 3) of the sensor.

The cap 140 may have a cable hole 140H. The cable hole 140H may pass through the bottom 140B.

A third sealing member 180T may have an overall C shape corresponding to the groove 400. The third sealing member 180T may be referred to as a side sealing member 180T. The third sealing member 180T may include a first part 181, a second part 182, a third part 183, a fourth part 184, a fifth part 185, and a bridge 186. The second part 182 may be extended by being bent from the first part 181. The third part 183 may be disposed opposite the second part 182, and may be extended by being bent from the first part 181. The fourth part 184 may be extended by being bent from the second part 182, and may be disposed opposite the first part 181. The fifth part 185 may be extended by being bent from the third part 183, and may be disposed opposite the first part 181. The bridge 186 may connect the second part 182 and the third part 183. The bridge 186 may come into contact with the bottom 140B of the cap 140. A bridge receiving portion 140LB may be recessed from the bottom 140B, and the bridge 186 may be placed in the bridge receiving portion 140LB. The third sealing member 180T may have a cable hole 186H. The cable hole 186H may pass through the bridge 186. The bridge 186 may improve convenience in assembly, as well as waterproofness of the sensor.

Referring to FIGS. 9 to 12, the second sealing member 170 may be connected to the first sealing member 160T and/or the third sealing member 180T.

The connection part CN may connect the first longitudinal portion 170L1 of the second sealing member 170 and the fourth part 164 of the first sealing member 160T. The connection part CN may connect the second longitudinal portion 170L2 of the second sealing member 170 and the fifth part 165 of the first sealing member 160T.

The connection part CN may connect the first longitudinal portion 170L1 of the second sealing member 170 and the fifth part 185 of the third sealing member 180T. The connection part CN may connect the second longitudinal portion 170L2 of the second sealing member 170 and the fourth part 184 of the third sealing member 180T.

The connection parts CN may be formed in insertion grooves IH of the caps 130 and 140 during coating of the sealing members described above with reference to FIG. 5. The first sealing member 160T, the second sealing member 170, and the third sealing member 180T may be integrally formed in a one-time coating process.

The column 167 may be formed on an outer surface of the bridge 166, and may be inserted into the through-hole 130H of the caps 130 and 140 to seal the through-hole 130H.

Accordingly, waterproof performance of the sensor may be further improved.

Figure 13:
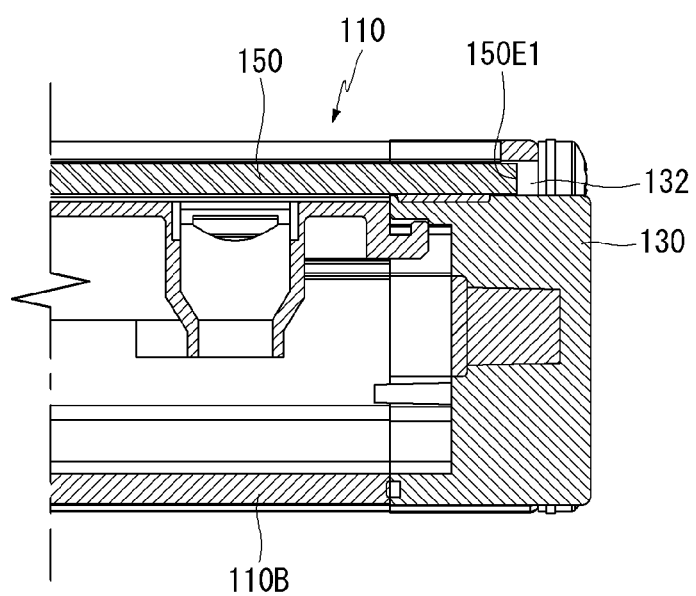

Referring to FIG. 13, the cover 150 may be expanded or contracted depending on external environments (e.g., temperature change), in which the sensor is installed, and may be repeatedly expanded or contracted. Compared to the housing 110 and/or the cap 130, the cover 150 may be further deformed depending on external environments.

The cap 130 may have a slot 132. One end 150E1 of the cover 150 may be inserted into the slot 132. In the case where the cover 150, having a different thermal expansion coefficient from the housing 110 and/or the cap 130, is relatively more deformed due to heat, waterproofness of the sensor may be reduced, but the sealing structure of the sensor described above has an advantage in that the waterproof performance of the sensor may be maintained constant at an initial set level.

Figure 14:
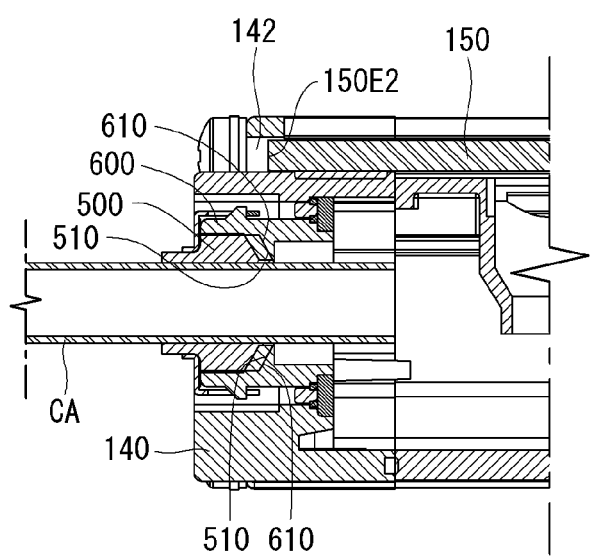

Referring to FIG. 14, the cap 140 may have a slot 142. An opposite end 150E2 of the cover 150 may be inserted into the slot 142.

Referring to FIGS. 10 and 14, a rubber 500 may be inserted into or fixed to an outer circumference of the cable CA. The rubber 500, having an inclined surface 510 in an insertion direction of the cable CA, may have an overall wedge shape. A waterproof ring 600 may be inserted into the cable hole 140H. The waterproof ring 600 may have an inner surface corresponding to the rubber 500. In other words, the waterproof ring 600 has an inclined surface 610 in the insertion direction of the cable CA, such that when the rubber 500 is inserted, the waterproof ring 600 may be in tight contact with or pressed into the rubber 500. While being in tight contact with an outer circumferential surface of the cable CA, the rubber 500 may come into tight contact with the waterproof ring 600, and the waterproof ring 600 may come into tight contact with the cable hole 140H. Accordingly, waterproofness may be improved around the cable CA.

Some embodiments of the disclosure described above or other embodiments are not mutually exclusive or distinct from each other. Some embodiments of the disclosure described above or other embodiments may be used jointly or combined with each other in configuration or function.

The above detailed description should not be construed in all aspects as limiting and should be considered illustrative. The scope of the present invention should be determined by rational interpretation of the appended claims, and all changes within the scope of equivalents of the present invention are intended to be included in the scope of the present invention.

The invention claimed is:

1. A sensor comprising:
    an elongated and hollow housing having a first opening formed in a longitudinal direction of the housing, and a second opening formed at one end thereof;
    a cap disposed in the second opening;
    an elongated cover covering the first opening and having one end coupled to the cap;
    a first receiving groove formed on the housing at a position adjacent to the first opening and facing the cover;
    a second receiving groove formed on the cap at a position facing the cover;
    a front sealing member inserted into the first receiving groove and the second receiving groove, and coming into contact with the cover;
    a groove formed on the cap at a position adjacent to the second opening and facing the one end of the housing; and
    a side sealing member inserted into the groove and coming into contact with the one end of the housing,
    wherein the front sealing member comprises:
        a vertical portion coming into contact with a side surface of the cover; and
        a horizontal portion extending from the vertical portion and coming into contact with an inner surface of the cover.

2. The sensor of claim 1, wherein in a direction from the cap toward the housing, an area of the front sealing member, disposed on the second receiving groove, decreases toward the housing.

3. The sensor of claim 1, wherein the front sealing member, disposed on the first receiving groove, comes into contact with at least two surfaces of the cover based on an edge of the cover facing the first receiving groove.

4. The sensor of claim 1, wherein the cap further comprises:
an insertion groove connecting the second receiving groove and the groove; and
a connection part disposed in the insertion groove and connecting the front sealing member and the side sealing member.

5. The sensor of claim 1, wherein the cap has a bottom facing the second opening of the housing, a side wall formed around the bottom, and a cable hole formed by passing through the bottom,
wherein the side sealing member has parts disposed in the groove, and a bridge connecting the parts across the bottom, and
wherein the bridge is coupled to the bottom.

6. The sensor of claim 5, further comprising:
a cable inserted into the cable hole;
a waterproof ring inserted into the cable hole and coming into contact with the cable hole; and
a rubber coming into contact with an outer circumferential surface of the cable and inserted into the waterproof ring to be in tight contact with the waterproof ring.

7. The sensor of claim 6, wherein the waterproof ring and the rubber have inclined surfaces corresponding to each other.

8. The sensor of claim 1, wherein the cap has a slot disposed adjacent to the one end of the cover, and
wherein the one end of the cover is inserted into the slot.

9. The sensor of claim 8, wherein a space is formed between the one end of the cover and the slot.

10. The sensor of claim 1, wherein the cap has a bottom facing the second opening of the housing, a side wall formed around the bottom, and a through-hole formed in the bottom, and
wherein the side sealing member has parts disposed in the groove, a bridge connecting the parts, and a column formed on an outer surface of the bridge and inserted into the through-hole.

11. The sensor of claim 1, wherein the cover is attached to the front sealing member.

12. The sensor of claim 1, further comprising a light emitting part or a light receiving part installed in the housing,
wherein the cover is formed as a light transmitting plate.

13. The sensor of claim 1, wherein the housing further includes:
a bottom extending in the longitudinal direction;
a side wall formed around the bottom;
a loop protruding inwardly from an upper region of the side wall;
and
a dam protruding from the loop toward the cover, and
wherein the first receiving groove is formed in the loop and has the front sealing member disposed therein.

14. The sensor of claim 1, wherein the front sealing member further comprises:
a side portion formed on the second receiving groove; and
a longitudinal portion formed on the first receiving groove and extending from the side portion, and
wherein the longitudinal portion comprises the vertical portion and the horizontal portion.

15. A sensor comprising:
an elongated and hollow housing having a first opening formed in a longitudinal direction of the housing, and a second opening formed at one end thereof;
a cap disposed in the second opening;
an elongated cover covering the first opening and having one end coupled to the cap;
a first receiving groove formed on the housing at a position adjacent to the first opening and facing the cover;
a second receiving groove formed on the cap at a position facing the cover;
a front sealing member inserted into the first receiving groove and the second receiving groove, and coming into contact with the cover;
a groove formed on the cap at a position adjacent to the second opening and facing the one end of the housing; and
a side sealing member inserted into the groove and coming into contact with the one end of the housing,
wherein the cap has a bottom facing the second opening of the housing, a side wall formed around the bottom, and a cable hole formed by passing through the bottom,
wherein the side sealing member has parts disposed in the groove, and a bridge connecting the parts across the bottom, and
wherein the bridge is coupled to the bottom.

16. The sensor of claim 15, further comprising:
a cable inserted into the cable hole;
a waterproof ring inserted into the cable hole and coming into contact with the cable hole; and
a rubber coming into contact with an outer circumferential surface of the cable and inserted into the waterproof ring to be in tight contact with the waterproof ring.

17. The sensor of claim 16, wherein the waterproof ring and the rubber have inclined surfaces corresponding to each other.

* * * * *